United States Patent
Tiwari et al.

(10) Patent No.: US 10,462,456 B2
(45) Date of Patent: Oct. 29, 2019

(54) AUTOMATED NETWORK-BASED TEST SYSTEM FOR SET TOP BOX DEVICES

(71) Applicant: Contec, LLC, Schenectady, NY (US)

(72) Inventors: Rajeev Tiwari, Schenectady, NY (US); Rafael Alberto Villanueva, Clifton Park, NY (US)

(73) Assignee: Contec, LLC, Schenectady, NY (US)

( * ) Notice: Subject to any disclaimer, the term of this patent is extended or adjusted under 35 U.S.C. 154(b) by 142 days.

(21) Appl. No.: 15/099,418

(22) Filed: Apr. 14, 2016

(65) Prior Publication Data

US 2017/0302917 A1 Oct. 19, 2017

(51) Int. Cl.
*H04N 17/04* (2006.01)
*H04L 12/46* (2006.01)

(52) U.S. Cl.
CPC ......... *H04N 17/04* (2013.01); *H04L 12/4641* (2013.01)

(58) Field of Classification Search
CPC combination set(s) only.
See application file for complete search history.

(56) References Cited

U.S. PATENT DOCUMENTS

| | | | |
|---|---|---|---|
| 5,983,022 A | 11/1999 | Watkins | |
| 6,057,882 A | 5/2000 | Van Den Branden Lambrecht | |
| 6,367,032 B1 | 4/2002 | Kasahara | |
| 6,385,739 B1 | 5/2002 | Barton | |
| 6,662,135 B1 | 12/2003 | Burns | |
| 6,728,767 B1 | 4/2004 | Day | |
| 7,020,573 B2 | 3/2006 | Wheeler | |
| 7,103,802 B2 | 9/2006 | Stephens | |
| 7,222,255 B1 | 5/2007 | Claessens | |
| 7,664,317 B1 * | 2/2010 | Sowerby | G06T 7/0002 382/162 |
| 7,770,066 B2 | 8/2010 | Kui-Yon | |
| 8,209,732 B2 | 6/2012 | Le | |
| 8,229,344 B1 | 7/2012 | Petersen | |
| 8,324,909 B2 | 12/2012 | Oakes | |
| 8,418,219 B1 | 4/2013 | Parsons | |
| 8,515,015 B2 | 8/2013 | Maffre | |
| 8,595,784 B2 | 11/2013 | Vanderhoff | |
| 8,689,071 B2 | 4/2014 | Valakh | |
| 8,806,400 B1 | 8/2014 | Bhawmik | |

(Continued)

FOREIGN PATENT DOCUMENTS

| | | |
|---|---|---|
| CN | 202261360 | 5/2012 |
| EP | 0989563 | 3/2000 |

(Continued)

OTHER PUBLICATIONS

Tiwari, Rajeev; Non-Final Office Action for U.S. Appl. No. 15/099,384, filed Apr. 14, 2016, dated Feb. 22, 2017, 9 pgs.

(Continued)

*Primary Examiner* — Alexander Gee
(74) *Attorney, Agent, or Firm* — Taylor English Duma LLP

(57) ABSTRACT

An automated network-based test system for set top box devices is disclosed. According to certain embodiments, the network-based testing system using Simple Network Management Protocol facilitates remote testing of thousands of set-top boxes, where groups of these set top boxes can be located in various locations that are remote from a main controller server that is running the tests remotely.

13 Claims, 2 Drawing Sheets

(56) References Cited

U.S. PATENT DOCUMENTS

| | | | |
|---|---|---|---|
| 8,978,081 B2 | 3/2015 | McClay | |
| 9,836,375 B2 | 12/2017 | Racey et al. | |
| 9,836,376 B2 | 12/2017 | Racey et al. | |
| 10,103,967 B2 | 10/2018 | Huh et al. | |
| 10,284,456 B2 | 5/2019 | Huh et al. | |
| 2001/0034847 A1 | 10/2001 | Gaul, Jr. | |
| 2002/0055834 A1 | 5/2002 | Andrade | |
| 2002/0070725 A1 | 6/2002 | Hilliges | |
| 2003/0005380 A1 | 1/2003 | Nguyen | |
| 2003/0036875 A1 | 2/2003 | Peck | |
| 2003/0182601 A1 | 9/2003 | Richardson | |
| 2004/0010323 A1* | 1/2004 | Martin | H04L 41/0213 |
| | | | 700/3 |
| 2004/0016708 A1 | 1/2004 | Rafferty | |
| 2004/0060069 A1 | 3/2004 | Abramson | |
| 2005/0138193 A1 | 6/2005 | Encarnacion | |
| 2005/0193294 A1 | 9/2005 | Hildebrant | |
| 2005/0286466 A1 | 12/2005 | Tagg | |
| 2006/0015785 A1 | 1/2006 | Chun | |
| 2006/0279301 A1 | 12/2006 | Treilbergs | |
| 2007/0097659 A1 | 5/2007 | Behrens | |
| 2007/0124114 A1 | 5/2007 | Shapiro | |
| 2007/0220380 A1 | 9/2007 | Ohanyan | |
| 2007/0230357 A1 | 10/2007 | Lin | |
| 2008/0031151 A1 | 2/2008 | Williams | |
| 2008/0064395 A1* | 3/2008 | Sibileau | G08C 17/02 |
| | | | 455/433 |
| 2008/0315898 A1 | 12/2008 | Cannon | |
| 2009/0013372 A1 | 1/2009 | Oakes | |
| 2009/0089854 A1 | 4/2009 | Le | |
| 2009/0282455 A1 | 11/2009 | Bell et al. | |
| 2010/0046729 A1* | 2/2010 | Bifano | H04M 3/42178 |
| | | | 379/201.12 |
| 2010/0138823 A1 | 6/2010 | Thornley | |
| 2010/0161769 A1* | 6/2010 | Qian | H04L 12/4641 |
| | | | 709/221 |
| 2011/0001833 A1 | 1/2011 | Grinkemeyer | |
| 2011/0006794 A1 | 1/2011 | Sellathamby | |
| 2011/0012632 A1 | 1/2011 | Merrow | |
| 2011/0035676 A1 | 2/2011 | Tischer | |
| 2011/0072306 A1 | 3/2011 | Racey et al. | |
| 2011/0099424 A1 | 4/2011 | Rivera Trevino | |
| 2011/0276684 A1 | 11/2011 | Singh | |
| 2012/0140081 A1 | 1/2012 | Clements | |
| 2012/0076015 A1 | 3/2012 | Pfeffer | |
| 2012/0131197 A1* | 5/2012 | Prentice | H04L 61/103 |
| | | | 709/226 |
| 2012/0163227 A1 | 6/2012 | Kannan | |
| 2012/0198442 A1 | 8/2012 | Kashyap | |
| 2012/0213259 A1 | 8/2012 | Renken et al. | |
| 2012/0233679 A1* | 9/2012 | Shedrinsky | H04L 63/0428 |
| | | | 726/7 |
| 2012/0275784 A1 | 11/2012 | Soto | |
| 2012/0278826 A1 | 11/2012 | Jones | |
| 2013/0063606 A1* | 3/2013 | McClay | H04N 17/004 |
| | | | 348/181 |
| 2013/0076217 A1 | 3/2013 | Thompson | |
| 2013/0104158 A1* | 4/2013 | Partee | H04H 60/32 |
| | | | 725/14 |
| 2013/0111275 A1* | 5/2013 | Ganesan | G06F 11/0748 |
| | | | 714/49 |
| 2013/0160064 A1 | 6/2013 | Van Rozen | |
| 2013/0167123 A1 | 6/2013 | Dura | |
| 2013/0178203 A1 | 7/2013 | Venkataraman | |
| 2014/0115580 A1 | 4/2014 | Kellerman | |
| 2014/0123200 A1 | 5/2014 | Park | |
| 2014/0132291 A1 | 5/2014 | Somachudan et al. | |
| 2014/0156819 A1 | 6/2014 | Cavgalar | |
| 2014/0162628 A1 | 6/2014 | Bevelacqua et al. | |
| 2014/0167794 A1 | 6/2014 | Nath et al. | |
| 2014/0187173 A1 | 7/2014 | Partee | |
| 2014/0207404 A1 | 7/2014 | Fritzsche | |
| 2014/0256373 A1 | 9/2014 | Hernandez | |
| 2014/0282783 A1 | 9/2014 | Totten | |
| 2014/0370821 A1 | 12/2014 | Guterman | |
| 2015/0109941 A1 | 4/2015 | Zhang | |
| 2015/0146712 A1 | 5/2015 | Jin | |
| 2015/0285589 A1 | 10/2015 | Radford et al. | |
| 2016/0048397 A1* | 2/2016 | Morales | G06F 9/441 |
| | | | 713/2 |
| 2016/0150419 A1 | 5/2016 | Thangarasa et al. | |
| 2016/0234163 A1 | 8/2016 | Nistor | |
| 2016/0286285 A1* | 9/2016 | Geyzel | H04N 21/835 |
| 2016/0299482 A1 | 10/2016 | Sun | |
| 2017/0048519 A1 | 2/2017 | Friel | |
| 2017/0126539 A1 | 5/2017 | Tiwari | |
| 2017/0249226 A1 | 8/2017 | Racey | |
| 2017/0302916 A1 | 10/2017 | Tiwari | |
| 2018/0074928 A1 | 3/2018 | Racey et al. | |
| 2018/0131594 A1 | 5/2018 | Huh et al. | |
| 2018/0131596 A1 | 5/2018 | Huh et al. | |
| 2019/0230022 A1 | 7/2019 | Huh et al. | |

FOREIGN PATENT DOCUMENTS

| | | |
|---|---|---|
| WO | 2001013604 | 2/2001 |
| WO | 2013169728 | 11/2013 |
| WO | 2014065843 | 5/2014 |

OTHER PUBLICATIONS

Racey, Darby; Notice of Allowance for U.S. Appl. No. 12/566,041, filed Sep. 24, 2009, dated Jun. 16, 2017, 21 pgs.

Racey, Darby; Notice of Allowance for U.S. Appl. No. 15/593,562, filed May 12, 2017, dated Aug. 9, 2017, 21 pgs.

Businesswire; Article entitled: "GENBAND and CTDI Settle Legal Dispute", located at <http://www.businesswire.com/news/home/20140321005528/en/GENBAND-CTDI-Settle-Legal-Dispute>, Mar. 21, 2014, 1 pg.

CED Magazine; Article entitled: "Cable Connects in Atlanta", located at <https://www.cedmagazine.com/article/2006/04/cable-connects-atlanta>, Apr. 30, 2006, 21 pgs.

TVTechnology; Article entitled: "S3 Group's Stormiest", located at <http://www.tvtechnology.com/expertise/0003/s3-groups-stormtest/256690>, published May 1, 2012, 2 pgs.

Digital Producer; Article entitled: "S3 Group Unveils Exclusive Partnership in North America With First US StormTest(TM) Decision Line Customer", located at <http://www.digitalproducer.com/article/S3-Group-Unveils-Exclusive-Partnership-in-North-America-With-First-US-StormTest(TM)-Decision-Line-Customer--1668213>, Sep. 8, 2011, 3 pgs.

Electronic Design; Article entitled: "Testing of MPEG-2 Set-Top Boxes Must be Fast, Thorough", located at <http://www.electronicdesign.com/print/839>, published Nov. 18, 2001, 9 pgs.

Euromedia; Article entitled: "Automated TV Client testing: Swisscom partners with S3 Group to deliver the ultimate IPTV experience", located at <http://advanced-television.com/wp-content/uploads/2012/10/s3.pdf>, earliest known pub. date—May 30, 2013, 2 pgs.

S3 Group; Document entitled: "White Paper: The Importance of Automated Testing in Set-Top Box Integration", earliest known publication date Jun. 17, 2014, 11 pgs.

Promptlink Communications; Article entitled: "Promptlink Communications Officially Launches Sep-Top Box Testing Platform", located at <https://www.promptlink.com/company/assets/media/2014-05-20.pdf>, published on May 20, 2014, 2 pgs.

Teleplan; Article entitled: "Screening & Testing", located at <https://www.teleplan.com/innovative-services/screening-testing/>, earliest known publication date Mar. 21, 2015, 7 pgs.

Tiwari, Rajeev; Final Office Action for U.S. Appl. No. 15/099,384, filed Apr. 14, 2016, dated Oct. 3, 2017, 29 pgs.

Racey, Darby; Notice of Allowance and Fees Due for U.S. Appl. No. 12/566,041, filed Sep. 24, 2009, dated Sep. 18, 2017, 14 pgs.

Racey, Darby; Notice of Allowance for U.S. Appl. No. 15/593,562, filed May 12, 2017, dated Sep. 8, 2017, 13 pgs.

Huh, Ina; Non-Final Office Action for U.S. Appl. No. 15/624,971, filed Jun. 16, 2017, dated Sep. 12, 2017, 28 pgs.

Compaq Computer Corporation; Plug and Play Bios Specification, Version 1.0A, May 5, 1994, 56 pgs.

(56) References Cited

OTHER PUBLICATIONS

Metrobility Optical Systems; Specification for "twister" 2131 100Mbps Multimode-to-Singlemode Media Converter, Apr. 2002, 16 pgs.
Racey, Darby; Advisory Action for U.S. Appl. No. 12/566,041, filed Sep. 24, 2009, dated Nov. 30, 2012, 2 pgs.
Racey, Darby; Final Office Action for U.S. Appl. No. 12/566,041, filed Sep. 24, 2009, dated Nov. 21, 2014, 15 pgs.
Racey, Darby; Final Office Action for U.S. Appl. No. 12/566,041, filed Sep. 24, 2009, dated May 5, 2016, 16 pgs.
Racey, Darby; Final Office Action for U.S. Appl. No. 12/566,041, filed Sep. 24, 2009, dated Sep. 7, 2012, 7 pgs.
Racey, Darby; Non-final Office Action for U.S. Appl. No. 12/566,041, filed Sep. 24, 2009, dated Oct. 31, 2011, 8 pgs.
Racey, Darby; Non-final Office Action for U.S. Appl. No. 12/566,041, filed Sep. 24, 2009, dated Dec. 15, 2016, 13 pgs.
Racey, Darby; Non-final Office Action for U.S. Appl. No. 12/566,041, filed Sep. 24, 2009, dated Apr. 4, 2014, 12 pgs.
Racey, Darby; Non-final Office Action for U.S. Appl. No. 12/566,041, filed Sep. 24, 2009, dated Sep. 23, 2015, 17 pgs.
Racey, Darby; Non-final Office Action for U.S. Appl. No. 12/566,041, filed Sep. 24, 2009, dated Sep. 6, 2013, 7 pgs.
Racey, Darby; Restriction Requirement for U.S. Appl. No. 12/566,041, filed Sep. 24, 2009, dated Feb. 15, 2012, 5 pgs.
Kumar, Samant; International Search Report and Written Opinion for PCT/US16/53768, filed Sep. 26, 2016, dated Feb. 3, 2017, 17 pgs.
Valakh, Vladzimir; Office Action for Canadian Patent Application No. 2,739,188, filed May 5, 2011, dated Feb. 24, 2017, 2 pgs.
Kumar, Samant; International Search Report and Written Opinion for PCT/US2016/058507, filed Oct. 24, 2016, dated Jan. 3, 2017, 12 pgs.
Nordman, Bruce, "Testing Products with Network Connectivity," Jun. 21, 2011 [retrieved online at http://citeseerx.is1.psu.edu/viewdoc/download?doi=10.1.1.695.772&rep=rep1&type=pdf on Feb. 6, 2017], 20 pgs.
Racey, Darby; Issue Notification for U.S. Appl. No. 12/566,041, filed Sep. 24, 2009, dated Nov. 15, 2017, 1 pg.
Racey, Darby; Response to Amendment under Rule 312 for U.S. Appl. No. 12/566,041, filed Sep. 24, 2009, dated Nov. 1, 2017, 8 pgs.
Racey, Darby; Issue Notification for U.S. Appl. No. 15/593,562, filed May 12, 2017, dated Nov. 15, 2017, 1 pg.
Racey, Darby; Response to Amendment under Rule 312 for U.S. Appl. No. 15/593,562, filed May 12, 2017, dated Oct. 31, 2017, 7 pgs.
Huh, Ina; Corrected Notice of Allowability for U.S. Appl. No. 15/624,971, filed Jun. 16, 2017, dated Jun. 26, 2018, 12 pgs.
Huh, Ina; Notice of Allowance for U.S. Appl. No. 15/624,971, filed Jun. 16, 2017, dated May 24, 2018, 9 pgs.
Tiwari, Rajeev; Advisory Action for U.S. Appl. No. 15/099,384, filed Apr. 14, 2016, dated Jan. 31, 2018, 4 pgs.
Huh, Ina; Non-Final Office Action for U.S. Appl. No. 15/348,950, filed Nov. 10, 2016, dated Apr. 5, 2018, 39 pgs.
Huh, Ina; Final Office Action for U.S. Appl. No. 15/624,971, filed Jun. 16, 2017, dated Jan. 25, 2018, 45 pgs.
Valakh, Vladzimir; Office Action for Canadian patent application No. 2,739,188, filed May 5, 2011, dated Jan. 30, 2018, 4 pgs.
Huh, Ina; Non-Final Office Action for U.S. Appl. No. 15/348,950, filed Nov. 10, 2016, dated Sep. 4, 2018, 14 pgs.
Huh, Ina; Issue Notification for U.S. Appl. No. 15/624,971, filed Jun. 16, 2017, dated Sep. 26, 2018, 1 pg.
Huh, Ina; Corrected Notice of Allowance for U.S. Appl. No. 15/348,950, filed Nov. 10, 2016, dated Feb. 14, 2019, 5 pgs.
Huh, Ina; Notice of Allowance for U.S. Appl. No. 15/348,950, filed Nov. 10, 2016, dated Jan. 8, 2019, 14 pgs.
Valakh, Vladzimir; Office Action for Canadian Patent Application No. 2,739,188, filed May 5, 2011, dated Dec. 20, 2018, 3 pgs.
Huh, Ina; Corrected Notice of Allowance for U.S. Appl. No. 15/348,950, filed Nov. 10, 2016, dated Mar. 26, 2019, 6 pgs.
Huh, Ina; Corrected Notice of Allowance for U.S. Appl. No. 15/348,950, filed Nov. 10, 2016, dated Apr. 1, 2019, 6 pgs.
Huh, Ina; Issue Notification for U.S. Appl. No. 15/348,950, filed Nov. 10, 2016, dated Apr. 17, 2019, 1 pg.

* cited by examiner

AUTOMATED NETWORK-BASED TEST SYSTEM FOR SET TOP BOX DEVICES

CROSS REFERENCE TO RELATED APPLICATIONS

This application is related to concurrently filed patent application entitled, "An Automated Network-Based Test System For Set Top Box Devices," by Rajeev Tiwari and Rafael Villanueva.

TECHNICAL FIELD

The present invention is directed to a system for testing set top boxes.

BRIEF DESCRIPTION OF THE DRAWINGS

For a better understanding of the aforementioned aspects of the invention as well as additional aspects and embodiments thereof, reference should be made to the Description of Embodiments below, in conjunction with the following drawings in which like reference numerals refer to corresponding parts throughout the figures.

DETAILED DESCRIPTION

Figure 1:
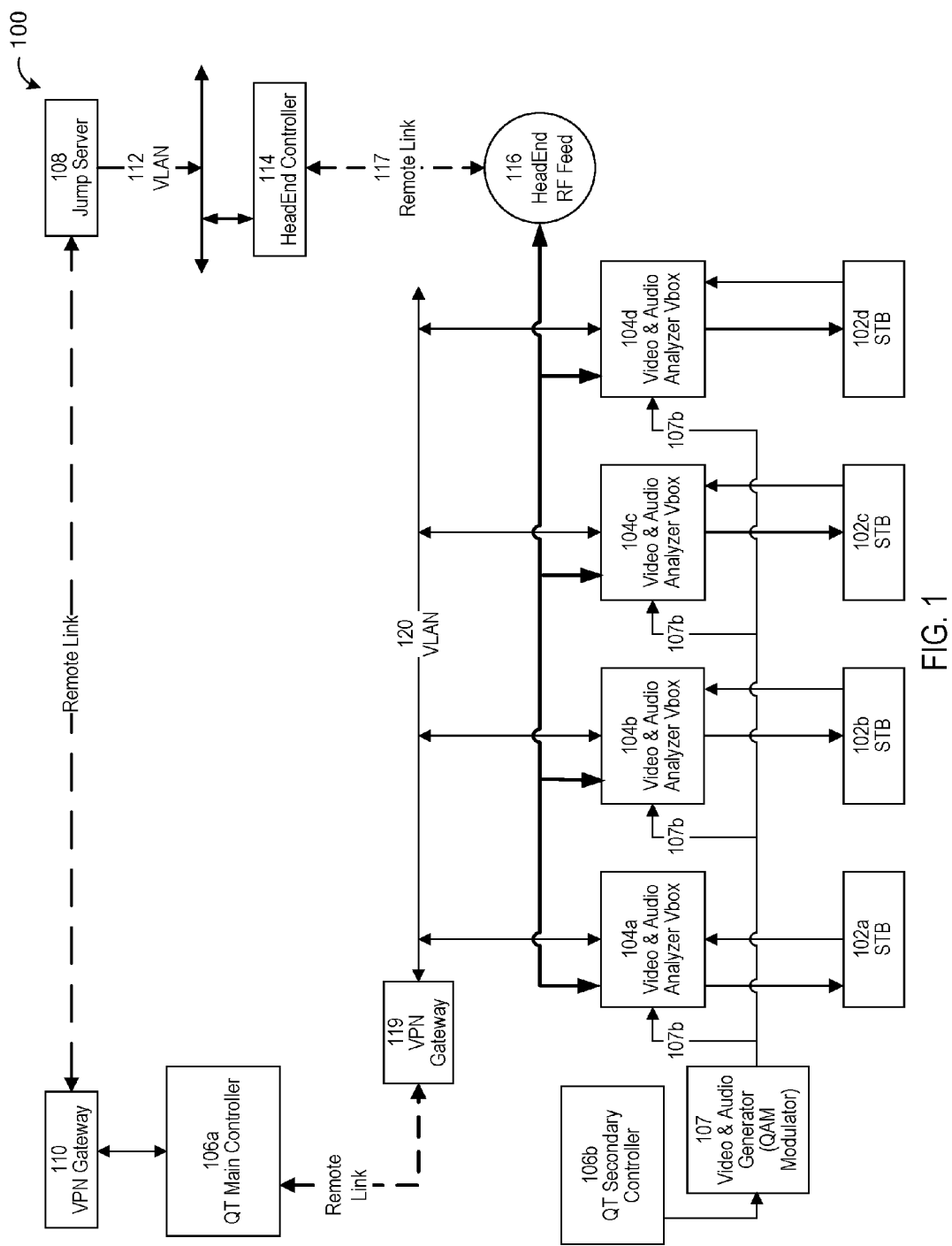
FIG. 1 illustrates a high-level system architecture for testing set top boxes using a jump server, according to certain embodiments.

Methods, systems, user interfaces, and other aspects of the invention are described. Reference will be made to certain embodiments of the invention, examples of which are illustrated in the accompanying drawings. While the invention will be described in conjunction with the embodiments, it will be understood that it is not intended to limit the invention to these particular embodiments alone. On the contrary, the invention is intended to cover alternatives, modifications and equivalents that are within the spirit and scope of the invention. The specification and drawings are, accordingly, to be regarded in an illustrative rather than a restrictive sense.

Moreover, in the following description, numerous specific details are set forth to provide a thorough understanding of the present invention. However, it will be apparent to one of ordinary skill in the art that the invention may be practiced without these particular details. In other instances, methods, procedures, components, and networks that are well known to those of ordinary skill in the art are not described in detail to avoid obscuring aspects of the present invention.

Automated testing of end-user devices is described in patent application Ser. No. 12/566,041, entitled, "Method And System For Automated Test of End-User Devices," filed Sep. 24, 2009, and is hereby incorporated by reference in its entirety.

According to certain embodiments, a network-based testing system is used for testing multimedia devices such as set top boxes.

According to certain embodiments, the network-based testing system can test traditional non-IP based set-top boxes as well as IP based set-top boxes simultaneously on a given test bench.

According to certain embodiments, a network-based based testing system using Simple Network Management Protocol is used for testing set top boxes.

According to certain embodiments, the network-based testing system using Simple Network Management Protocol facilitates remote testing of thousands of set-top boxes, where groups of these set top boxes can be located in various locations that are remote from a main controller server that is running the tests remotely.

According to certain embodiments, the network-based testing system using Simple Network Management Protocol improves testing robustness. The use of Simple Network Management Protocol to retrieve diagnostic and health status information directly from the set-top box that is under test obviates the need of having to rely on test output from the video analyzer (Vbox) and OCR software algorithms to analyze such output.

According to certain embodiments, the network-based testing system using Simple Network Management Protocol improves reliability on pass/fail criteria evaluations without compromising test flow execution time. For example, in traditional non-network based testing using video capture and OCR methods to get reading values slows down test execution time.

According to certain embodiments, the network-based testing system using Simple Network Management Protocol minimizes dependency on set-top box middleware changes.

According to certain embodiments, the network-based testing system using Simple Network Management Protocol reduces test time for pass/fail criteria evaluations. According to certain embodiments, the network-based testing system using Simple Network Management Protocol reduces set-top box latency time because set-top boxes react quicker to SNMP based commands. Further, the SNMP based commands can retrieve reading values in less time than that of traditional OCR based testing methods. Further, according to certain embodiments, the development of SNMP based testing software requires less effort and the time for running the test scripts are reduced as compared to traditional OCR based testing methods.

According to certain embodiments, some of the STB related functionalities that are tested include the following non-limiting list of functionalities: a) power and boot up detection functionality, b) STB provisioning status (e.g., channel map, user guide), c) tuner status (out-of-band and in-band tuner health status, such as frequency, signal to noise ratio, carrier lock detection, etc), d) purchases status (such as verifying if any pending pay-per-view events generated by a subscriber are still residing in the STB and has not been cleared), e) code modules versions (for example, check to see if the code module versions are up to date), f) hard drive status (for example, check for read/write errors and check for bad sectors in the hard drive), g) power outlet (for example, check to see if power outlet is operating properly), h) analog video & audio outputs (for example, check to see if Composite, Component, RF, Baseband Audio types of output are present), i) digital video & audio outputs (for example, check to see if High-Definition Multimedia Interface, Sony/Philips Digital Interface Format, Coaxial types of outputs are present), j) clear the content on the hard drive and use smart drive parameters, k) USB status (check to see if the USB port of the STB is able to power up the STB and whether the USB port is able to recognize a given device that is connected to the USB port), l) restore factory settings, m) IP address, MAC address, serial number and network parameter detection functionality, n) check STB software and hardware version, o) video & audio quality parameters (macroblocking detection).

FIG. 1 illustrates a high-level system architecture for testing set top boxes using a jump server, according to certain embodiments. FIG. 1 shows a testing system 100 that includes a virtual local area network (VLAN) 120 that, in turn, includes a plurality of video and audio analyzers 104a-d (herein referred to as "Vbox"), a quick test (QT) secondary controller 106b, and a video and audio generator (QAM modulator) 107. The plurality of video and audio analyzers 104a-d (Vboxes) are in communication with a quick test (QT) main controller 106a via a virtual private network (VPN) gateway 119. The plurality of video and audio analyzers 104a-d (Vboxes) are part of the test bench at the testing system 100. FIG. 1 also shows a plurality of set top boxes 102a-d. The plurality of set top boxes 102a-d are the devices under test and are connected to corresponding video and audio analyzers (Vboxes) 104a-d so that tests can be conducted on the set-top boxes. According to certain embodiments, quick test (QT) main controller 106a is remote from VLAN 120 and the STBs 102a-d. Thus, the quick test (QT) main controller 106a can remotely control and manage the testing of multiple sets of STBs that are located in multiple remote locations (only one such location is shown in FIG. 1). FIG. 1 also shows a virtual private network (VPN) gateway 110, a jump server 108 associated with a remote virtual local area network (VLAN) 112 of a headend office, a headend controller 114 of the headend office, and a headend radio frequency (RF) feed 116. FIG. 1 shows only 4 set top boxes (STBs) and 4 corresponding Vboxes. However, the embodiments are not limited to only 4 STBs and 4 corresponding Vboxes. The number of STBs and corresponding Vboxes may vary from implementation to implementation. According to certain embodiments, each testing system may include as many as 24 STBs and 24 corresponding Vboxes. According to certain embodiments, each testing system may include more than 24 STBs and 24 corresponding Vboxes. According to certain embodiments, each testing system may include fewer than 24 STBs and 24 corresponding Vboxes.

According to certain embodiments, each of the STBs 102a-d is connected to corresponding video and audio analyzer (Vbox) 104a-d via video and audio cables, for example. Each of the Vboxes 104a-d in VLAN 120 is connected via Ethernet to quick test (QT) main controller 106a via VPN gateway 119. The quick test secondary controller 106b is connected to video and audio generator (QAM modulator) 107 via a USB port. The QAM modulator is connected (107b) to the Vboxes 104a-d via radio frequency coaxial cables, for example. According to certain embodiments, jump server 108 communicates with quick test (QT) main controller 106a through the Internet via VPN gateway 110 to the VPN where the quick test (QT) main controller 106a resides.

According to certain embodiments, quick test (QT) main controller 106a executes a software application that causes a scanner to scan the respective serial number and media access control (MAC) address of each STB 102a-d of the plurality of STBs under test in the testing system 100. Thus, test system 100 is not dependent on an optical character reader (OCR) to capture the serial number and MAC address of each STB under test, nor is test system 100 dependent on OCR methods and applications to analyze the video and audio output signals from the STBs under test. Quick test (QT) main controller 106a establishes communication with jump server 108 via VPN gateway 110 using Secure Shell (SSH) protocol. SSH is an encrypted protocol that allows remote login over an unsecured network such as the Internet. Jump server 108 is associated with a VLAN 112. Jump server 108 authenticates and authorizes quick test (QT) main controller 106a. After authentication and authorization of quick test (QT) main controller 106a, jump server 108 allows quick test (QT) main controller 106a to resolve the host IP values to be provisioned to the STBs 102a-d by headend controller 114 in VLAN 112 such that each of the STBs 102a-d can communicate with the quick test (QT) main controller 106a using Simple Network Management Protocol (SNMP).

According to certain embodiments, headend controller 114 provides video and audio services to the STBs under test in testing system 100. Non-limiting examples of video and audio services provided to the STBs under test include: 1) middleware codes for updating the STB, and 2) messages to enable channel lineup, and 3) digital video recording (DVR) services.

According to certain embodiments, a testing software application on the quick test (QT) controller 106a executes a test script (for testing the STBs) and sends a request to jumper server 108 asking the jump server 108 to execute SNMP commands in order to collect diagnostic and health status of each of the STBs under test in testing system 100. Further, such SNMP commands provides an additional channel of communication between QT main controller and the STBs. Thus, QT main controller can cause the Vboxes 104a-d to generate IR signals for sending such IR signals to corresponding STBs 102a-d in order to test the STBs 102a-d. Further, the headend controller 114 can perform troubleshooting and debugging of any problems in the STBs under test. In prior art testing systems of STBs, the Vboxes had to rely on optical character reader (OCR) applications to analyze video and audio output signals that are outputed from the STBs as part of the testing the STBs. Such OCR (e.g., video OCR) applications perform analysis of the output signals (to test various functionalities of the STBs) relatively poorly. The use of the jump server 108 to allow quick test (QT) main controller 106a to resolve the host IP values to be provisioned to the STBs 102a-d by headend controller 114 in VLAN 112 facilitates the testing of traditional STBs as well as IP-based STBs at the same time in test system 100 (in other words, the testing system is designed for IP-based STBs but at the same time it is flexible enough to accommodate traditional STBs at a given test bench, wherein the traditional STBs are tested using traditional OCR methods, for example). Such an SNMP testing approach is very flexible because it is cross-platform compatible with the latest networking technologies and operating systems. For example, the QT main controller is not constrained to be in the same VLAN as the Vboxes. Thus, the quick test (QT) main controller 106a can remotely control and manage the testing of multiple sets of STBs that are located in multiple remote locations. Also, by this approach, the quick test (QT) main controller 106a has an additional channel of communication with the STBs 102a-d, and thus, communication between the quick test (QT) main controller 106a and the STBs is faster and more reliable than traditional approaches. Further, the SNMP approach is flexible to allow the use of various software platforms for test script development such as open source tools, as a non-limiting example. Further yet, such an approach makes it easier for the headend controller 114 to perform troubleshooting and debugging operations remotely on the STBs 102a-d under test in testing system 100. For example, headend controller 114 can provide radio frequency (RF)

signals and DOCSIS (Data Over Cable Service Interface Specification) signaling to RF feed 116 via a DOCSIS set-top box gateway (DSG channel) in order to test the STBs under test.

According to certain embodiments, quick test (QT) secondary 106b in combination with QAM modulator 107, as part of the testing of the STBs, execute an application to stream video and audio test patterns to the STBs 102a-d in order for the respective Vboxes 104a-d to take video and audio output measurements from the corresponding STBs 102a-d. Further, headend controller 114 provides Out of Band and In Band radio frequency (RF) signals and DOCSIS (Data Over Cable Service Interface Specification) signaling to RF feed 116 via Cable Modem Termination System (CMTS) and a DOCSIS set-top box gateway (DSG channel) to communicate with the STBs under test using SNMP. Such RF signals and DOCSIS are used for testing the STBs under test. According to certain embodiments, headend controller 114 establishes the DSG channel.

According to certain embodiments, each Vbox 104a-d captures video and audio reading values, which are outputs from the respective STB 102a-d under test. Video and audio reading values include digitized raw video and audio data (for example, the reading values include RF OUT, Composite, Component, HDMI, RF OUT, BaseBand L&R, Digital Coaxial and Optical). The respective Vboxes 104a-d send the captured video and audio reading values to quick test (QT) main controller 106a. According to certain embodiments, quick test (QT) main controller 106a performs HSL (hue, saturation, lightness) color space calculations and audio parameter calculations. The HSL and audio parameter calculations are evaluated during the test flow execution.

According to certain embodiments, a sample test script for testing the STBs is as follows:

Scan Serial and MAC bar code labels of the STB under test.
Obtain model identification and test list configuration of the STB (for example, obtain list of video and audio outputs that need to be tested for a given STB model).
Switch the Headend signals to RF signals as inputs to STBs (Vbox has internal 3×1 RF switch hardware and software application that control the RF input signals to the STBs).
Reboot each STB under test (for synchronization and DOCSIS-based STBs require reboot as part of the boot up sync process).
Wait for reboot.
Open connection to Jump Server (a software application on quick test (QT) main controller opens a port connection to jump server using SSH protocol).
Scan network based on MAC bar code on each STB under test in order to resolve IP address of each STB as decided by the headend controller
Get OID (object identifier) 'RF HOST IP' and evaluate according to resolved IP (Confirmation for STB IP acquisition and confirm through OID for MAC barcode label match of the respective STB under test).
Get OID 'Firmware/middleware Version' and evaluate if it is the correct version as required.
Get OID 'Out of Band Tuner' and evaluate for health status (Out Of Band Tuner handles provisioning messages and other messages from Headend controller to STB. The parameters that are evaluated include: Carrier Lock and signal-to-noise ratio (SNR) status. For example, the expected values for both readings are 'YES' and 'GOOD', respectively).
Get OID 'InBand Tuner 1' and evaluate for Corr/UnCorr Bytes (the InBand Tuner processes video & audio and corrected bytes. The uncorrected blocks are checked for problems on the MPEG transport stream that is decoded in the STB. For example, the pass criteria is: 1) Corrected Bytes counter less than 20 in a time window of 20 seconds, and 2) Uncorrected Blocks are less than 2 in a 20 second time window).
Get OID 'InBand Tuner 2' and evaluate for Corrected/UnCorrected Bytes (STBs with DVR services include an additional InBand Tuner]
Get OID 'stbDvrFailures' and evaluate for HDD health status (STB under test provides status for hard drive recognition. Problems related to the hard drive on DVR can be found by evaluating embedded diagnostic information. The evaluation is based on the status values retrieved from STB under test, and the expected values must be either 'true', 'false' as the case may be).
Get OID 'stbHDMIstate' and evaluate for HDMI health status (for example, evaluate the HDMI connection port status and the pass criteria value is 'connected-PowerOn(2)')
Switch local RF Video & Audio Test pattern signals to RF input (Vbox has internal 3×1 RF switch hardware and software application that controls the RF input signals to the STB. The quick test (QT) main controller controls the Vbox).
Tune Test Channel (the quick test (QT) main controller sends IR (Infrared) commands to STB to tune channel.
Get Baseband Video HSL measurements.
Get BaseBand Audio Amplitude, Frequency and THD (Total Harmonic Distortion)
Get Video & Audio HDMI measurements (QT Main controller gets these measurements from STB).
Clear HDD (Hard Drive Disk) (the QT main controller sends IR commands to STB to clear recordings in the HDD).
Close connection to Jump Server.

Figure 2:
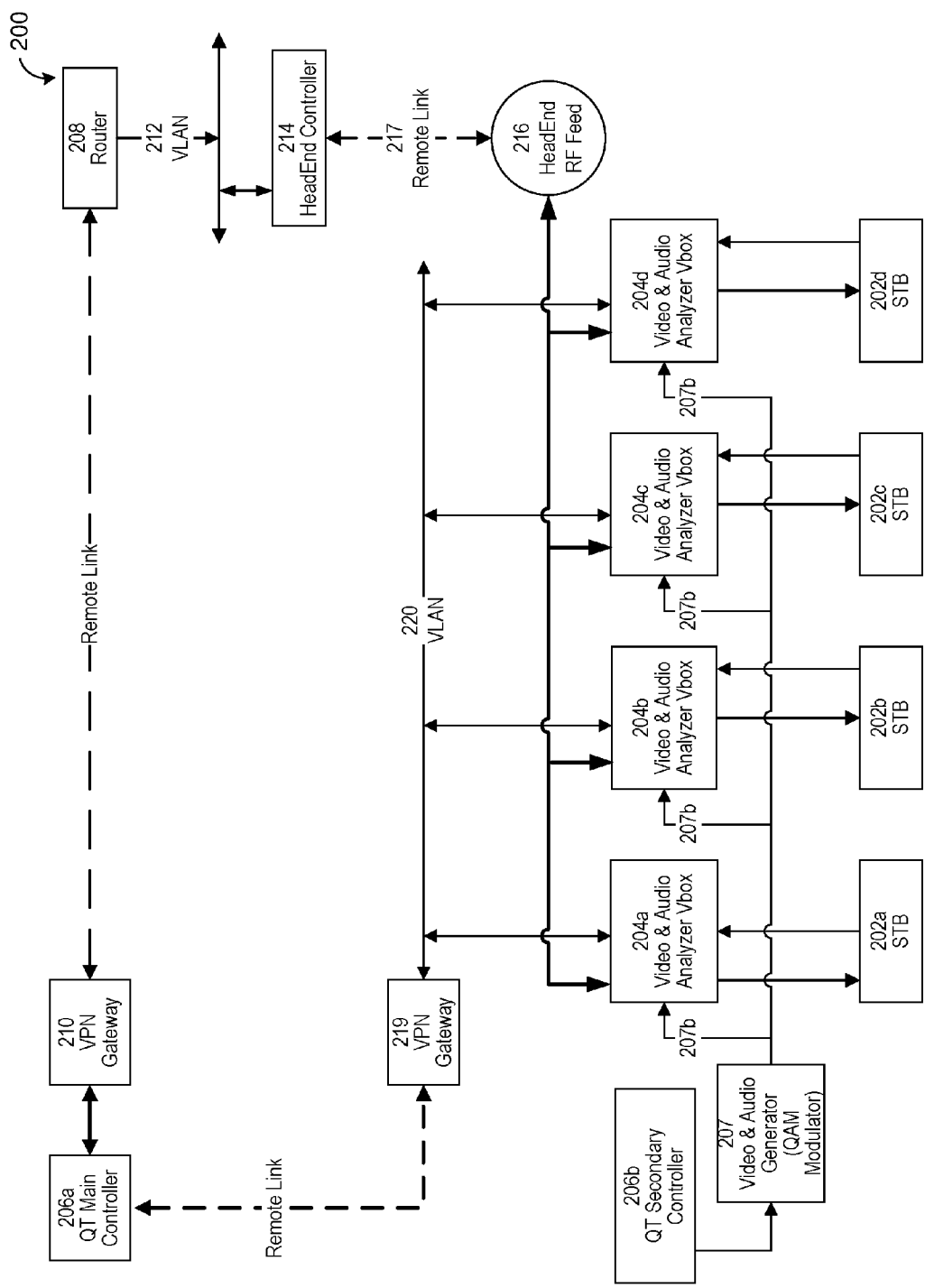
FIG. 2 illustrates a high-level system architecture for testing set top boxes using a VPN gateway and router, according to certain embodiments.

FIG. 2 illustrates a high-level system architecture for testing set top boxes using a router, according to certain embodiments. FIG. 2 shows a testing system 200 that includes a virtual local area network (VLAN) 220 that, in turn, includes a plurality of video and audio analyzers 204a-d (herein referred to as "Vbox"), a quick test (QT) secondary controller 206b, and a video and audio generator (QAM modulator) 207. The plurality of video and audio analyzers 204a-d (Vboxes) are in communication with a quick test (QT) main controller 206a via a virtual private network (VPN) gateway 219. The plurality of video and audio analyzers 204a-d (Vboxes) are part of the test bench at the testing system 200. FIG. 2 also shows a plurality of set top boxes 202a-d. The plurality of set top boxes 202a-d are the devices under test and are connected to corresponding video and audio analyzers (Vboxes) 204a-d so that tests can be conducted on the set-top boxes. According to certain embodiments, quick test (QT) main controller 206a is remote from VLAN 220 and the STBs 202a-d. Thus, the quick test (QT) main controller 206a can remotely control and manage the testing of multiple sets of STBs that are located in multiple remote locations (only one such location is shown in FIG. 2). FIG. 2 also shows a virtual private network (VPN) gateway 210, a router 208 that enables communication with a remote virtual local area network (VLAN) 212 of a headend office, a headend controller 214 of the headend office, and a headend radio frequency (RF) feed 216. FIG. 2 shows only 4 set top boxes (STBs) and 4 corresponding Vboxes. However, the embodiments are not limited to only 4 STBs and 4 corresponding Vboxes. The number of STBs and corresponding Vboxes may vary from implementation to implementation. According to certain embodiments, each testing system may include as many as 24 STBs and 24 corresponding Vboxes. According to certain embodiments, each testing system may include more than 24 STBs and 24 corresponding Vboxes. According to certain embodiments, each testing system may include fewer than 24 STBs and 24 corresponding Vboxes.

According to certain embodiments, each of the STBs 202a-d is connected to corresponding video and audio analyzer (Vbox) 204a-d via video and audio cables, for example. Each of the Vboxes 204a-d in VLAN 220 is connected via Ethernet to quick test (QT) main controller 206a via VPN gateway 219. The quick test secondary controller 206b is connected to video and audio generator (QAM modulator) 207 via a USB port. The QAM modulator is connected (207b) to the Vboxes 204a-d via radio frequency coaxial cables, for example. According to certain embodiments, router 208 communicates with quick test (QT) main controller 206a through the Internet via VPN gateway 210 to the VPN where the quick test (QT) main controller 206a resides.

According to certain embodiments, quick test (QT) main controller 206a executes a software application that causes a scanner to scan the respective serial number and media access control (MAC) address of each STB 202a-d of the plurality of STBs under test in the testing system 200. Thus, test system 200 is not dependent on an optical character reader (OCR) to capture the serial number and MAC address of each STB under test, nor is test system 200 dependent on OCR methods and applications to analyze the video and audio output signals from the STBs under test. Quick test (QT) main controller 206a establishes a connection to VLAN 212 (where the headend controller 212 resides) via router 208 via VPN gateway 210. Once the quick test (QT) main controller 206a establishes a connection to VLAN 212 via router 208, the quick test (QT) main controller 206a resolves the host IP values to be provisioned to the STBs 202a-d by headend controller 214 in VLAN 212 such that each of the STBs 202a-d can communicate with the quick test (QT) main controller 206a using Simple Network Management Protocol (SNMP).

According to certain embodiments, headend controller 214 provides video and audio services to the STBs under test in testing system 200. Non-limiting examples of video and audio services provided to the STBs under test include: 1) middleware codes for updating the STB, and 2) messages to enable channel lineup, and 3) digital video recording (DVR) services.

According to certain embodiments, a testing software application on the quick test (QT) controller 206a executes SNMP commands in order to collect diagnostic and health status of each of the STBs under test in testing system 200. Further, such SNMP commands provides an additional channel of communication between QT main controller and the STBs. Thus, QT main controller can cause the Vboxes 204a-d to generate IR signals for sending such IR signals to corresponding STBs 202a-d in order to test the STBs 202a-d. Further, the headend controller 214 can perform troubleshooting and debugging of any problems in the STBs under test. In prior art testing systems of STBs, the Vboxes had to rely on optical character reader (OCR) applications to analyze video and audio output signals that are outputted from the STBs as part of the testing the STBs. Such OCR (e.g., video OCR) applications perform analysis of the output signals (to test various functionalities of the STBs) relatively poorly. Quick test (QT) main controller 206a, via router 208, resolves the host IP values to be provisioned to the STBs 202a-d by headend controller 214 in VLAN 212 and thus facilitates the testing of traditional STBs as well as IP-based STBs at the same time in test system 200, as previously explained herein. Such an SNMP testing approach is very flexible because it is cross platform compatible with the latest networking technologies and operating systems. For example, the QT main controller is not constrained to be in the same VLAN as the Vboxes. Thus, the quick test (QT) main controller 206a can remotely control and manage the testing of multiple sets of STBs that are located in multiple remote locations. Also, by this approach, the quick test (QT) main controller 206a has an additional channel of communication with the STBs 202a-d and thus communication between the quick test (QT) main controller 206a and the STBs is faster and more reliable. Further, the SNMP approach is flexible to allow the use of various software platforms for test script development such as open source tools, as a non-limiting example. Further yet, such an approach makes it easier for the headend controller 214 to perform troubleshooting and debugging operations remotely on the STBs 202a-d under test in testing system 200. For example, headend controller 214 can provide radio frequency (RF) signals and DOCSIS (Data Over Cable Service Interface Specification) signaling to RF feed 216 via a DOCSIS set-top box gateway (DSG channel) in order to test the STBs under test.

According to certain embodiments, quick test (QT) secondary 206b in combination with QAM modulator 207, as part of the testing of the STBs, execute an application to stream video and audio test patterns to the STBs 202a-d in order for the respective Vboxes 204a-d to take video and audio output measurements from the corresponding STBs 202a-d. Further, headend controller 214 provides Out of Band and In Band radio frequency (RF) signals and DOCSIS (Data Over Cable Service Interface Specification) signaling to RF feed 216 via a Cable Modem Termination System (CMTS) and a DOCSIS set-top box gateway (DSG channel) to communicate with the STBs under test using SNMP. Such RF signals and DOCSIS are used for testing the STBs under test. According to certain embodiments, headend controller 214 establishes the DSG channel.

According to certain embodiments, each Vbox 204a-d captures video and audio reading values, which are outputs from the respective STB 202a-d under test. Video and audio reading values include digitized raw video and audio data (for example, the reading values include RF OUT, Composite, Component, HDMI, RF OUT, BaseBand L&R, Digital Coaxial and Optical). The respective Vboxes 204a-d send the captured video and audio reading values to quick test (QT) main controller 206a. According to certain embodiments, quick test (QT) main controller 206a performs HSL (hue, saturation, lightness) color space calculations and audio parameter calculations. The HSL and audio parameter calculations are evaluated during the test flow execution.

According to certain embodiments, a sample test script for testing the STBs is as follows:
Scan Serial and MAC bar code labels of the STB under test.
Obtain model identification and test list configuration of the STB (for example, obtain list of video and audio outputs that need to be tested for a given STB model).
Switch the Headend signals to RF signals as inputs to STBs (Vbox has internal 3×1 RF switch hardware and software application that control the RF input signals to the STBs).

Reboot each STB under test (for synchronization and DOCSIS-based STBs require reboot as part of the boot up sync process).

Wait for reboot.

Scan network based on MAC bar code on each STB under test in order to resolve IP address of each STB as decided by the headend controller Get OID (object identifier) 'RF HOST IP' and evaluate according to resolved IP (Confirmation for STB IP acquisition and confirm through OID for MAC barcode label match of the respective STB under test).

Get OID 'Firmware/middleware Version' and evaluate if it is the correct version as required.

Get OID 'Out of Band Tuner' and evaluate for health status (Out Of Band Tuner handles provisioning messages and other messages from Headend controller to STB. The parameters that are evaluated include: Carrier Lock and signal-to-noise ratio (SNR) status. For example, the expected values for both readings are 'YES' and 'GOOD', respectively).

Get OID 'InBand Tuner 1' and evaluate for Corr/UnCorr Bytes (the InBand Tuner processes video & audio and corrected bytes. The uncorrected blocks are checked for problems on the MPEG transport stream that is decoded in the STB. For example, the pass criteria is: 1) Corrected Bytes counter less than 20 in a time window of 20 seconds, and 2) Uncorrected Blocks are less than 2 in a 20 second time window).

Get OID 'InBand Tuner 2' and evaluate for Corrected/UnCorrected Bytes (STBs with DVR services include an additional InBand Tuner]

Get OID 'stbDvrFailures' and evaluate for HDD health status (STB under test provides status for hard drive recognition. Problems related to the hard drive on DVR can be found by evaluating embedded diagnostic information. The evaluation is based on the status values retrieved from STB under test, and the expected values must be either 'true', 'false' as the case may be).

Get OID 'stbHDMIstate' and evaluate for HDMI health status (for example, evaluate the HDMI connection port status and the pass criteria value is 'connected-PowerOn(2)')

Switch local RF Video & Audio Test pattern signals to RF input (Vbox has internal 3×1 RF switch hardware and software application that controls the RF input signals to the STB. The quick test (QT) main controller controls the Vbox).

Tune Test Channel (the quick test (QT) main controller sends IR (Infrared) commands to STB to tune channel.

Get Baseband Video HSL measurements.

Get BaseBand Audio Amplitude, Frequency and THD (Total Harmonic Distortion)

Get Video & Audio HDMI measurements (QT Main controller gets these measurements from STB).

Clear HDD (Hard Drive Disk) (the QT main controller sends IR commands to STB to clear recordings in the HDD).

Check USB status and optical connections status.

Check smart drive parameters to evaluate the health status of the hard disk drive.

Obtain diagnostic information for Ultra High Definition (UHD) and 4K resolutions.

Obtain network characteristics for security and data analysis.

In the foregoing specification, embodiments of the invention have been described with reference to numerous specific details that may vary from implementation to implementation. The specification and drawings are, accordingly, to be regarded in an illustrative rather than a restrictive sense.

I claim:

1. A network-based testing system for simultaneously testing a plurality of devices under test at a plurality of remote test locations, comprising:
 a plurality of remote test systems, each remote test system configured to test a subset of the plurality of devices under test and comprising
  a Quadrature Amplitude Modulation (QAM) modulator for providing video test patterns to the subset of the plurality of devices under test at the remote test system, and
  a plurality of video and audio analyzers, each of the video and audio analyzers associated with one of the subset of the plurality of devices under test at the remote test system and configured to provide infrared signals to the associated device under test and to capture video and audio output from the associated device under test,
 a main controller that is operatively connected to the plurality of remote test systems and configured to simultaneously conduct tests on the plurality of devices under test;
 a headend controller operatively connected to the main controller and to the plurality of remote test systems and configured to provide video services to the plurality of devices under test and to provision IP addresses to IP-based devices under test of the plurality of devices under test,
 wherein
  the main controller determines which of the plurality of devices under test are IP-based devices under test and which of the plurality of devices under test are non-IP-based devices under test,
  the main controller receives from the headend controller the IP addresses associated with the IP-based devices under test and is configured to employ Simple Network Management Protocol (SNMP) to communicate with and test the IP-based devices under test using the associated IP addresses,
  the main controller causes a subset of the plurality of video and audio analyzers to provide infrared signals to the non-IP-based devices under test and to capture video and audio signals that are output by the non-IP-based devices under test in response to the infrared signals, and
  the main controller receives and analyzes the video and audio signals that are captured by the video and audio analyzers.

2. The network-based testing system of claim 1, wherein the communication between the main controller and the IP-based devices under test comprise SNMP queries regarding the diagnostic and health status of the IP-based devices under test.

3. The network-based testing system of claim 1, wherein the video signals that are output by the non-IP-based devices under test in response to the infrared signals comprise information regarding the diagnostic and health status of the non-IP-based devices under test.

4. The network-based testing system of claim 1, wherein the video services provided by the headend controller comprise channel lineup information.

5. The network-based testing system of claim 1, wherein the main controller is connected to the headend controller through a jump server.

6. The network-based testing system of claim 1, wherein the main controller is connected to the headend controller through a router.

7. The network-based testing system of claim 1, wherein the main controller is connected to the headend controller through a virtual private network (VPN) gateway.

8. The network-based testing system of claim 1, wherein the devices under test comprise set-top boxes.

9. A testing system for simultaneously testing a plurality of devices under test including IP-based devices under test and non-IP-based devices under test, comprising:
- a plurality of devices under test, the plurality of devices under test including IP-based devices under test and non-IP-based devices under test;
- a Quadrature Amplitude Modulation (QAM) modulator for providing video test patterns to the plurality of devices under test;
- a plurality of video/audio analyzers, each of the video/audio analyzers associated with one of the plurality of devices under test and configured to provide infrared signals to the associated device under test and to capture video and audio output from the associated device under test;
- a main controller operatively connected to the plurality of video/audio analyzers and configured to simultaneously conduct tests on the plurality of devices under test;
- a headend controller operatively connected to the main controller and configured to provide video services to the plurality of devices under test and to provision IP addresses to the IP-based devices under test, wherein the main controller
- determines which of the plurality of devices under test are IP-based devices under test,
- receives from the headend controller the IP addresses associated with the IP-based devices under test,
- employs Simple Network Management Protocol (SNMP) to communicate with and test the IP-based devices under test using the associated IP addresses,
- causes a subset of the plurality of video/audio analyzers to provide infrared signals to the non-IP-based devices under test and to capture video and audio reading values output by the non-IP-based devices under test, and
- receives and analyzes the video and audio reading values that are captured by the video/audio analyzers and provided to the main controller.

10. The testing system of claim 9, wherein the communication between the main controller and the IP-based devices under test comprises SNMP queries regarding the diagnostic and health status of the IP-based devices under test.

11. The testing system of claim 9, wherein the video signals that are output in response to the infrared signals comprise information regarding the diagnostic and health status of the non-IP-based devices under test.

12. The testing system of claim 9, wherein the video services provided by the headend controller comprise channel lineup information.

13. The testing system of claim 9, wherein the devices under test comprise set-top boxes.

* * * * *